United States Patent
Hogg et al.

(10) Patent No.: US 6,175,755 B1
(45) Date of Patent: Jan. 16, 2001

(54) METHOD OF LUNG SURFACE AREA ANALYSIS USING COMPUTED TOMOGRAPHY

(75) Inventors: James C. Hogg; Kenneth P. Whittall, both of Vancouver; Harvey O. Coxson, North Vancouver, all of (CA)

(73) Assignee: The University of British Columbia, Vancouver (CA)

( * ) Notice: Under 35 U.S.C. 154(b), the term of this patent shall be extended for 0 days.

(21) Appl. No.: 09/330,537

(22) Filed: Jun. 11, 1999

Related U.S. Application Data (60) Provisional application No. 60/089,132, filed on Jun. 11, 1998.

(51) Int. Cl.$^7$ .......................................................... A61B 6/03

(52) U.S. Cl. .............................................................. 600/407

(58) Field of Search ...................................... 600/407, 408, 600/409, 411, 538; 128/203.12, 204.23; 250/362, 363.02, 363.04; 378/4, 6, 7, 8, 21, 27

(56) References Cited

U.S. PATENT DOCUMENTS

| | | |
|---|---|---|
| 4,939,757 | 7/1990 | Nambu . |
| 4,989,597 * | 2/1991 | Werner ........................... 128/203.12 |
| 5,067,494 | 11/1991 | Rienmueller et al. . |
| 5,844,241 * | 12/1998 | Liu et al. ........................ 250/363.04 |

OTHER PUBLICATIONS

Coxson, H.O., et al., "Measurement of Lung Expansion With Computed Tomography and Comparison With Quantitative Histology," *Journal of Applied Physiology*, vol. 79, 1995, pp. 1525–1530.

Coxson, H.O., et al., "Quantification of Idiopathic Pulmonary Fibrosis Using Computed Tomography and Histology," *American Journal of Respiratory & Critical Care Medicine*, vol. 155, 1997, pp. 1649–1656.

Crapo, R., et al., "Spirometric Values Using Techniques and Equipment That Meet ATS Recommendations," *American Review of Respiratory Diseases*, vol. 123, 1981, pp. 659–664.

Cruz–Orive, L.M., et al., "Sampling Designs for Stereology," *Journal of Microscopy*, vol. 122, Pt. 3, Jun. 1981, pp. 235–257.

(List continued on next page.)

*Primary Examiner*—George Manuel
(74) *Attorney, Agent, or Firm*—Christensen O'Connor Johnson Kindness PLLC (57) ABSTRACT

A computer-implementable method for estimating the surface area to volume ratio and the surface area of a lung based on x-ray attenuation data obtained from a computed tomography (CT) scan of the lung is disclosed. The method includes obtaining a plurality of CT images that include a lung image from a plurality of subjects. Each of the resulting CT images is displayed such that an x-ray attenuation value is associated with each pixel. Thereafter the lung image is extracted from the CT image. Then, the volume of each lung is calculated based on the plurality of lung images extracted from the plurality of CT images. Also, the volume-of-gas to weight-of-tissue ratio for all of the pixels included in each of the lung images is calculated using the x-ray attenuation value associated with the pixel. The pixel ratio values are used to determine the median volume-of-gas to weight-of tissue ratio for all the pixels included in all the lung images for each lung. Then the surface area to volume ratio of each lung is determined using quantitative histology. Thereafter, the surface area to volume ratio versus the median volume-of-gas to weight-of-tissue ratio is plotted for each lung. The plot is used to determine a best-fit prediction equation that correlates the surface area to volume ratio to the volume-of-gas to weight-of-tissue ratio. The equation is used to estimate the surface area to volume ratio and the surface area of a new lung based on a CT scan of that lung.

24 Claims, 4 Drawing Sheets

OTHER PUBLICATIONS

DuBois, A.B., et al., "A Rapid Plethysmographic Method for Measuring Thoracic Gas Volume: A Comparison with Nitrogen Washout Method for Measuring Functional Residual Capacity in Normal Subjects," *Journal of Clinical Investigations*, vol. 35, 1956, pp. 322–326.

Gevenois, P.A., et al., "Comparison of Computed Density and Macroscopic Morphometry in Pulmonary Emphysema," *American Journal of Respiratory & Critical Care Medicine* vol. 152, 1995, pp. 653–657.

Goldman, H.I., et al., "Respiratory Function Test: Normal Values at Median Altitudes and the Prediction of Normal Results," *American Review of Tuberculosis*, vol. 79, 1959, pp. 457–467.

Gould, G.A., et al., "CT Measurments of Lung Density in Life can Quantitate Distal Airspace Enlargement—An Essential Defining Feature of Human Emphysema," *American Review of Respiratory Diseases*, vol. 137, 1988, pp. 380–392.

Haber, P.S., et al., "Alveolar Size as a Determinant of Pulmonary Distensibility in Mammalian Lungs," *Journal of Applied Physiology: Respiration, Environmental and Exercise Physiology*, vol. 54, 1983, pp. 837–845.

Hedlund, L.W., et al., "Evaluating Lung Density by Computed Tomography," *Seminars in Respiratory Medicine*, vol. 5, No. 1, Jul. 1983, pp. 76–87.

Hogg, J.C., et al., "Elastic Properties of the Centrilobular Emphysematous Space," *Journal of Clinical Investigation*, vol. 48, 1969, pp. 1306–1312.

Hogg, J.C., et al., "Lung Structure and Function in Cigarette Smokers," *Thorax*, vol. 49, 1994, pp. 473–478.

Hogg, J.C., et al., "Regional Lung Volume and Pleural Pressure Gradient Estimated From Lung Density in Dogs," *Journal of Applied Physiology*, vol. 27, No. 2, Aug. 1969, pp. 198–203.

Hogg, J.C., et al., "Site and Nature of Airway Obstruction Chronic Obstructive Lung Disease," *The New England Journal of Medicine*, vol. 278, No. 25, Jun. 20, 1968, pp. 1355–1360.

Massaro, G.D., et al., "Retinoic Acid Treatment Abrogates Elastase–Induced Pulmonary Emphysema in Rats," *Nature Medicine*, vol. 3, No. 6, Jun. 1997, pp. 675–677.

McCuaig, K.E., et al., "Variability in Measurements of Pressure Volume Curves in Normal Subjects," Notes, *American Review of Respiratory Diseases*, vol. 131, 1985, pp. 656–658.

Miller, A., et al., "Single Breath Diffusing Capacity in a Representative Sample of the Population of Michigan, a Large Industrial State: Predicted Values, Lower Limits of Normal, and Frequencies of Abnormality by Smoking History," *American Review of Respiratory Diseases*, vol. 127, 1983, pp. 270–277.

Miller, R.R., et al., "Limitations of Computed Tomography in the Assessment of Emphysema," *American Review of Respiratory Diseases*, vol. 139, 1989, pp. 980–983.

Müller, N.L., et al.,"'Density Mask': An Objective Method to Quantitate Emphysema Using Computed Tomography," *Chest*, vol. 94, No. 4, Oct. 1988, pp. 782–787.

Osborne, S., et al., "Exponential Analysis of the Pressure–Volume Curve: Correlation with Mean Linear Intercept and Emphysema in Human Lungs," *American Review of Respiratroy Diseases*, vol. 137, 1988, pp. 1083–1088.

Rogers, R.M., et al., "Lung Reduction Surgery in Chronic Obstructive Lung Disease," *Medical Clinics of North America*, vol 80, No. 3, May 1996, pp. 623–644.

Sciurba, F.C., et al., "Improvement in Pulmonary Function and Elastic Recoil After Lung–Reduction Surgery for Diffuse Emphysema," *The New England Journal of Medicine*, vol. 334, No. 17, Apr. 25, 1996, pp. 1095–1099.

Snider, G.L., et al., "The definition of emphysema: Report of a National Heart, Lung and Blood Institute, Division of Lung Diseases Workshop," *American Review of Respiratory Diseases*, vol. 132, 1985, pp. 182–185.

* cited by examiner

| | |
|---|---|
| STEP 1. | OBTAIN A PLURALITY OF CT IMAGES OF A LUNG FROM A PLURALITY OF SUBJECTS |
| STEP 2. | FOR EACH CT IMAGE, DISPLAY THE CT IMAGE ON A SCREEN |
| STEP 3. | FOR EACH CT IMAGE, EXTRACT THE LUNG IMAGE FROM THE CT IMAGE |
| STEP 4. | CACULATE THE VOLUME OF EACH LUNG |
| STEP 5. | FOR EACH EXTRACTED LUNG IMAGE, CALCULATE A VOLUME-OF-GAS TO WEIGHT-OF-TISSUE RATIO FOR EACH PIXEL INCLUDED IN THE LUNG IMAGE |
| STEP 6. | FOR EACH LUNG, CALCULATE THE MEDIAN VOLUME-OF-GAS TO WEIGHT-OF-TISSUE RATIO |
| STEP 7. | OBTAIN A SURFACE AREA TO VOLUME RATIO OF EACH LUNG USING QUANTITATIVE HISTOLOGY |
| STEP 8. | PLOT THE SURFACE AREA TO VOLUME RATIO VERSUS THE MEDIAN VOLUME-OF-GAS TO WEIGHT-OF-TISSUE RATIO FOR THE LUNGS |
| STEP 9. | DETERMINE A BEST-FIT PREDICTON EQUATION |

METHOD OF LUNG SURFACE AREA ANALYSIS USING COMPUTED TOMOGRAPHY

CROSS REFERENCE TO RELATED APPLICATION

This application claims the benefit of U.S. provisional application Ser. No. 60/089,132, filed Jun. 11, 1998.

FIELD OF THE INVENTION

The present invention relates to methods of analyzing lungs and, more particularly, to methods of estimating the surface area and other parameters of a lung.

BACKGROUND OF THE INVENTION

Emphysema is defined as abnormal permanent enlargement of a lung's airspaces distal to the terminal bronchioles, accompanied by destruction of their walls, without obvious fibrosis. When x rays are applied to a lung, the changes to the lung associated with emphysema decrease the attenuation of x rays passing through the thorax and shift their distribution, allowing advanced emphysema to be detected during life. Not only is it important to be able to detect emphysema during life, it is also important to determine the extent and severity of emphysema during life.

The ability to estimate the extent and severity of emphysema during life is important for several reasons. The accurate detection of lung destruction when it first appears and the careful mapping of its progression over time allow the natural history of emphysema to be better understood. Further, the treatment of advanced emphysema by lung volume reduction surgery requires knowledge of the location of the lesions and an objective method of assessing the surgical result. Finally, recent provocative experimental studies, suggesting that alveolar number and surface area to volume ratio can be restored to a normal level by pharmacotherapy in rats with elastase-induced emphysema ("Retinoic acid treatment abrogates elastase-induced pulmonary emphysema in rats." Massaro, G. et al., *Nature Medicine*, 3:675–677 (1997)), indicate a future need for measurements that can accurately assess the effectiveness of such therapeutic interventions.

A need exists for methods and apparatus for determining certain parameters of a lung, such as lung surface area, that can be used to diagnose and monitor emphysema progression in a patient, both before and after the patient is surgically and medically treated.

SUMMARY OF THE INVENTION

In accordance with this invention, a computer-implementable method for estimating selected parameters of a lung, such as lung surface area, using computed tomography (CT) is provided. The method combines a quantitative CT scan analysis of a lung with a stereologically based histology quantification of the lung anatomy. In addition to human lungs, the method may be applied to the lungs of other species.

In accordance with further aspects of this invention, a plurality of CT images (slices) containing the image of a lung are obtained from a plurality of subjects. The CT images are sequentially displayed on a screen, such that the intensity of each pixel is determined by its x-ray attenuation value, and analyzed. During analysis, the lung image is extracted from the CT image. After extraction, the method calculates the volume of each lung based on the plurality of lung images extracted from the plurality of CT images, respectively.

The method also calculates a volume-of-gas to weight-of-tissue ratio (inflation value) of each lung. To this end, first the method calculates a volume-of-gas to weight-of-tissue ratio for each pixel included in each of the plurality of lung images, using the x-ray attenuation value of the pixels. The method then obtains a median volume-of-gas to weight-of-tissue ratio for all of the pixels included in all of the lung images.

Next, the method obtains a surface area to volume ratio of each lung using quantitative histology.

After the median volume-of-gas to weight-of-tissue ratio and the surface area to volume ratio for all lungs have been determined, the method plots the surface area to volume ratio versus the median volume-of-gas to weight-of-tissue ratio for the lungs. The method then uses the plot to obtain a best-fit prediction equation that correlates surface area to volume ratio to volume-of-gas to weight-of-tissue ratio.

In accordance with other aspects of this invention, the prediction equation thus obtained is used to estimate the surface area to volume ratio, and the surface area, of a new lung. To this end, at least one CT scan image of the new lung is analyzed in the manner described above to obtain the volume-of-gas to weight-of-tissue ratio of the lung. That is, the lung image is separated from the CT scan image and the x-ray attenuation data and, thus, volume-of-gas to weight-of-tissue ratio associated with each pixel are determined. These data are used to obtain a median volume-of-gas to weight-of-tissue ratio. The method then enters this value into the prediction equation to obtain the surface area to volume ratio of the new lung. The surface area to volume ratio is used to determine the surface area of the lung.

In accordance with further aspects of the present invention, the numerical processing of x-ray attenuation data obtained from a CT scan image to obtain the surface area to volume ratio and the surface area of a lung is carried out by a computer program.

The present method allows a quantitative assessment of a lung to be made without having to remove lung tissue from a patient. Furthermore, as will be readily appreciated by those skilled in this area of technology and others, the present method is much faster and more efficient than lung analysis methods based solely on quantitative histology. The present invention is ideally suited for providing objective quantitative data in meaningful structural and physiologic terms that can be used to follow disease progression and to plan and assess the surgical and medical intervention of the disease.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 3:
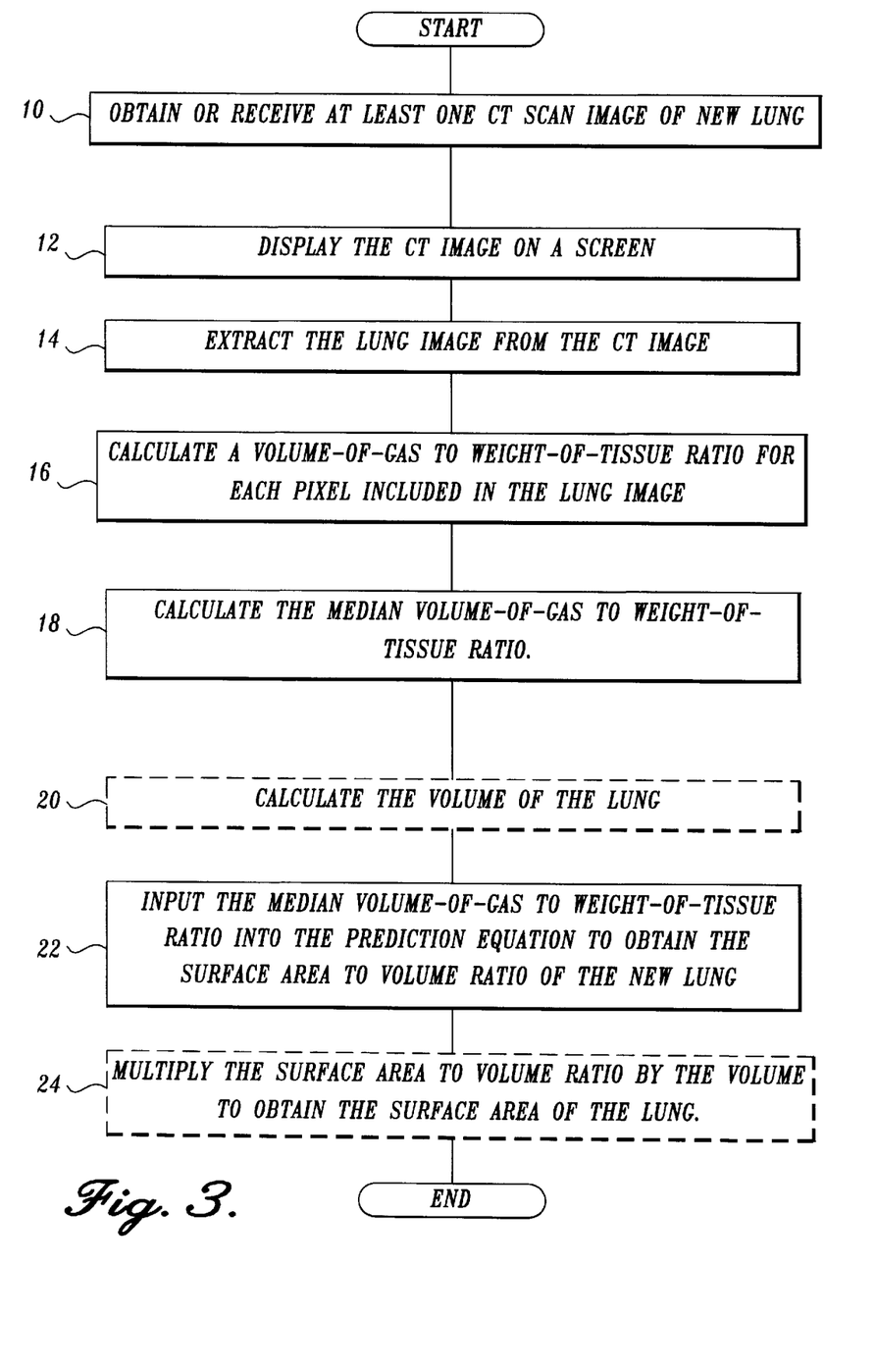
FIG. 3 illustrates the steps involved in estimating the surface area to volume ratio and surface area of a new lung, using the prediction equation determined by the present invention.

The present invention is directed to providing a computer-implementable method of accurately estimating the surface area to volume ratio and the surface area of a lung, using x-ray attenuation data obtained from a computed tomography (CT) scan of the lung. The method involves developing a best-fit prediction equation that relates median volume-of-gas to weight-of-tissue ratio to surface area to volume ratio (FIG. 1) and using the developed equation to determine the surface area to volume ratio and surface area of a patient's lung (FIG. 3).

Figure 1:
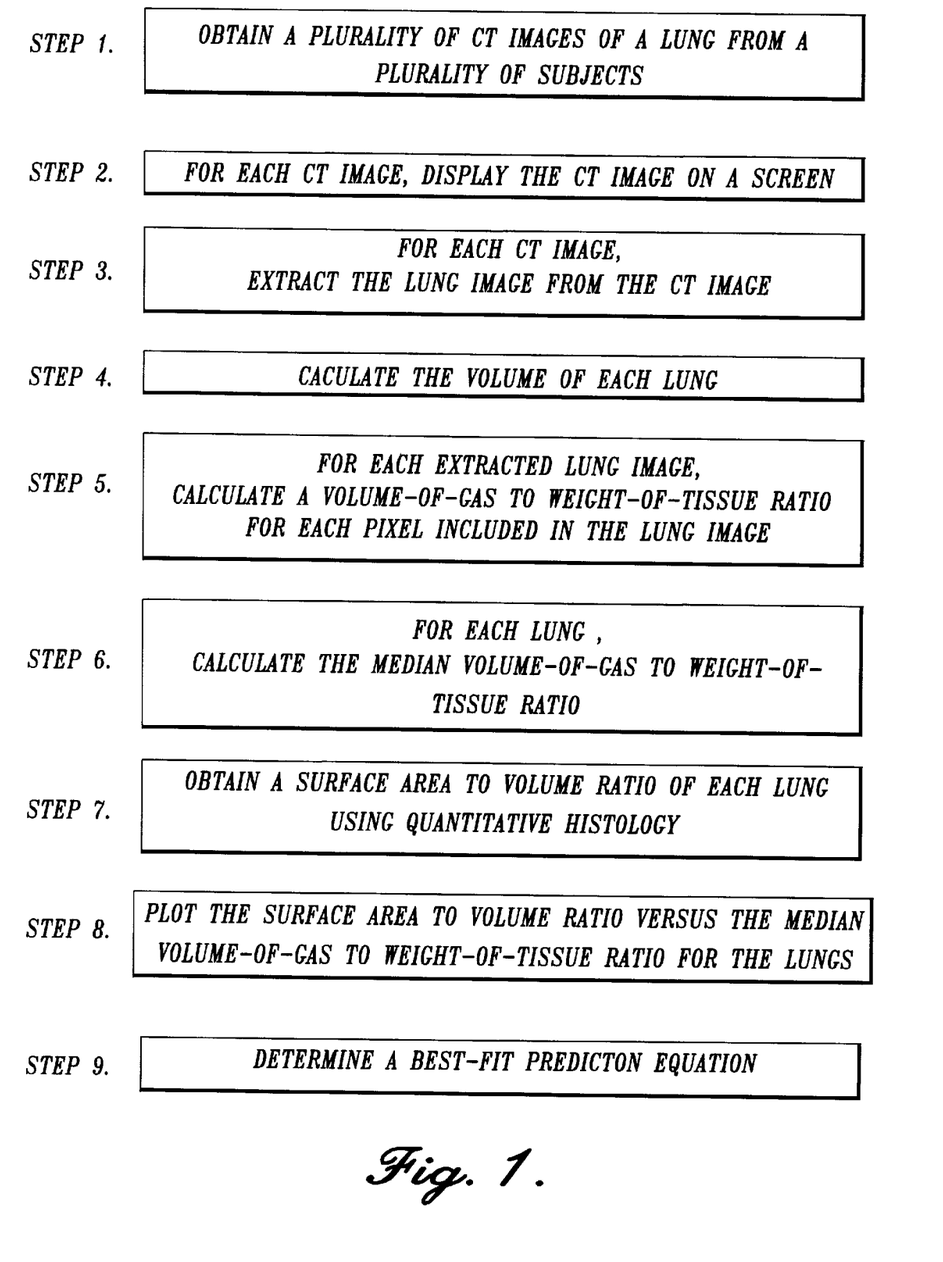
FIG. 1 illustrates the steps involved in determining a best-fit prediction equation that relates lung surface area to volume ratio and median volume-of-gas to weight-of-tissue ratio using x-ray attenuation data obtained from a CT scan image.

Referring to FIG. 1, a plurality of CT images of a lung are obtained from a plurality of subjects (Step 1). Each of the CT images thus obtained is displayed on a screen (Step 2). The display is such that the intensity of each pixel is associated with an x-ray attenuation value. Next, the lung image is extracted from the CT image (Step 3). Thereafter the volume of each lung is calculated based on the plurality of lung images extracted from the plurality of CT images, respectively (Step 4). Then, the volume-of-gas to weight-of-tissue ratio for each pixel included in each of the plurality of lung images is calculated, using the x-ray attenuation value associated with the intensity of the pixel (Step 5). Then the median volume-of-gas to weight-of-tissue ratio for all of the pixels included in all of the lung images is calculated for each lung (Step 6). Next, the surface area to volume ratio of each lung is obtained using quantitative histology (Step 7). Thereafter, the median volume-of-gas to weight-of-tissue ratio is plotted against the surface area to volume ratio for each lung (Step 8). The plot is used to determine a best-fit exponential prediction equation that correlates the surface area to volume ratio to the volume-of-gas to weight-of-tissue ratio (Step 9). As noted above, and more fully discussed below, the thusly obtained prediction equation is used to estimate the surface area to volume ratio and the surface area of new lungs by: obtaining at least one CT image that includes an image of the new lung; extracting the lung image from the CT image; and determining the median volume-of-gas to weight-of-tissue ratio of the new lung in the manner described above and illustrated in FIG. 1.

Turning now to a more detailed description of the steps illustrated in FIG. 1, since methods of obtaining CT images of lungs (Step 1) are well known in the art, such methods are not described in detail herein. The intensity of each pixel in each of the CT images displayed on a screen (Step 2) is associated with an x-ray attenuation value (HU: Hounsfield Units), as is also well known in the art.

Figure 2:
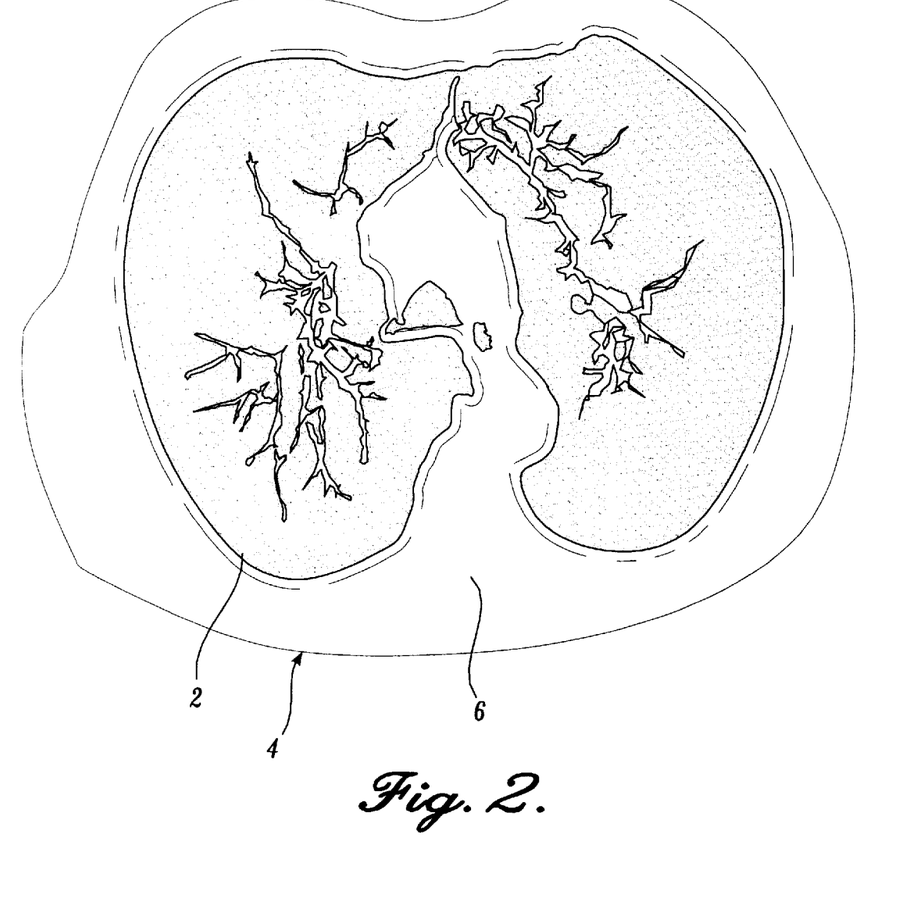
FIG. 2 schematically illustrates a lung CT image that includes a lung image and background material displayed on a screen.

Methods of extracting a lung image from a CT image (Step 3) are also well known in the art. In this regard, FIG. 2 illustrates a CT image displayed on a screen 4. The CT image includes the image of a lung 2 and background material, namely, the surrounding chest wall and other internal organs 6. One way of extracting the lung image from the CT image is for a user to identify and mark a pixel located within the lung on a screen with a point by, for example, clicking a computer mouse. The user then selects a threshold x-ray attenuation value that, when applied to the CT image, will separate the lung image from the background material included in the CT image. (Typically, −600 to −400 HU, for example). Thereafter, the threshold x-ray attenuation value and a conventional contour-following algorithm are used to separate or extract the lung image from the CT image. Specifically, starting from the pixel marked with a point within the lung image, the nearest pixel associated with the threshold x-ray attenuation value is found. This pixel is on the boundary between the lung image and the background material included in the CT image. A contour-following algorithm is then used, starting from the thusly found pixel on the boundary, to trace the entire boundary to separate the lung image from the CT image. One commercially available program suitable for extracting a lung image from a CT image using x-ray attenuation threshold values is the Medical Image Viewer (Arkansas Children's Hospital, Little Rock, Ark.; and General Electric Medical Systems).

Methods of determining volume, density, weight, and volume-of-gas to weight-of-tissue ratio (inflation value) of a lung (Steps 4–6), using x-ray attenuation data obtained from a CT scan are also known. See, for example, "Measurement of lung expansion with computed tomography and comparison with quantitative histology," Coxson, H. et al, *Journal of Applied Physiology*, 79:1525–1530 (1995); and "Quantification of idiopathic pulmonary fibrosis using computed tomography and histology," Coxson, H. et al., *American Journal of Respiratory & Critical Care Medicine*, 155:1649–1656 (1997), the subject matters of which are incorporated herein by reference. Briefly, in Step 4, the volume of the lung (tissue and airspace) is calculated using the Cavalieri principle, which is known in the art. In accordance with this principle, the volume of pixels within the lung image is summed up to get total lung volume. Specifically, for each of the plurality of lung images extracted from the plurality of CT image slices, respectively, the area of a pixel is multiplied by the number of pixels in the lung image, and then multiplied by a CT image slice thickness to get total lung volume for the slice. Thereafter, the total lung volume for all of the CT image slices is summed up to obtain the total lung volume.

Then, the inflation (volume-of-gas to weight-of-tissue ratio) of each lung is calculated, by first calculating the volume-of-gas to weight-of-tissue ratio for each pixel included in each of the plurality of lung images (Step 5). The volume-of-gas to weight-of-tissue ratio for each pixel is calculated using the lung density. The density of the lung (g/ml) is estimated by adding 1000 to the Hounsfield Units (HU) of each pixel, and dividing it by 1000. (See "Evaluating lung density by computed tomography," Hedlund et al., *Seminars in Respiratory Medicine*, 5:76–87 (1983).) Lung weight is estimated by multiplying the mean lung density by the volume. The volume-of-gas to weight-of-tissue ratio for each pixel is calculated according to the following equation:

$$\frac{ml_{(gas)}}{g_{(tissue)}} = \text{Specific Volume}_{(tissue\ \&\ gas)} - \text{Specific Volume}_{(tissue)} \quad (1)$$

where specific volume is the inverse of density. The density of the lung (tissue and gas) is determined from the CT scan in the manner described above, and the density of tissue is assumed to be 1.065 g/ml. (See "Regional lung volume and pleural pressure gradient estimated from lung density in dogs," Hogg et al., *Journal of Applied Physiology*, 27:198–203 (1969)). When CT scanners used in the present method are those provided by General Electric Medical Systems, Equation 1 may be expressed as follows:

Gas(ml)/Tissue(g)=(1000/(x-ray attenuation value−24))−1/1.065 (2)

where the value −24 represents an offset specified by the manufacturer of the scanners. When other CT scanners are used, this value and, thus, the equation relating an x-ray attenuation value to the density of a lung may vary.

The pixel ratio values are then used to calculate the median value of the volume-of-gas to weight-of-tissue ratios for all of the pixels included in all of the lung images for each lung (Step 6).

The surface area to volume ratio of the lung (Step 7) is determined using a quantitative histology method that is also known in the art. Such a method is described in detail in the two Coxson et al. articles cited above and incorporated by reference herein. This method involves resected lung specimens fixed in inflation and sliced into 2 cm thick slices. The volume fraction of normal and emphysematous lung is estimated from the gross lung slices by floating them in water and overlaying a grid of points. The number of points falling on emphysematous lesions (larger than 5 mm in diameter to be visible in a CT scan, or smaller than 5 mm in diameter to be at the resolution limit of a CT scan) and normal lung parenchyma are determined using a magnifying lens. The tissue from the patients undergoing lung volume reduction surgery for severe emphysema is received directly from the operating room and fixed, without inflation, in 10% formalin. Hematoxylin- and eosin-stained histologic sections are prepared from random samples of the surgical specimens.

To optimize the sampling for the stereologic analysis, a cascade design technique as known in the art is used. (See "Sampling designs for stereology," Cruz-Orive et al., *Journal of Microscopy*, 122:235–257 (1981).) Level 1 is performed on the fixed slices of the lobectomy specimens. Levels 2 and 3 are performed on all available sections at the light microscopy level using point-counting programs such as Gridder (Wilrich Tech, Vancouver, B.C.), which generates random fields of view, projects a grid onto the field of view via a camera-lucida attachment on a Nikon Labophot light microscope, and tabulates the counts. Level 2 is done at 100× magnification using a grid of 80 points and 40 lines. The number of points falling on airspace, tissue (lung parenchyma), and medium sized blood vessels (50–1000 μm) as well as the number of intersects between the grid lines and the parenchymal-airspace interface are tabulated. Level 3 is performed on 10 random fields of view per slide at 400× magnification and the number of points falling on airspace components (alveolar macrophages, alveolar PMN, alveolar fluid, and empty space) as well as tissue components (alveolar wall, capillary lumen, and small blood vessels (20–50 μm)) are counted using a 100-point grid.

The volume fraction ($V_V$) of each of the lung components, ($V_{V(1c)}$), is estimated at each level according to the following equation:

$$V_{v(lc)} = \frac{\sum P_{(lc)}}{\sum P_{(total)}} \quad (3)$$

where $\Sigma P_{(1c)}$ is the number of points falling on the specific lung component, and $\Sigma P_{(total)}$ is the total number of points falling on the image.

The overall $V_V$ is calculated by multiplying the $V_V$ of the lung component at the highest level by the $V_V$ in the previous levels. For example, the volume fraction of capillaries would be calculated according to the following equation:

$$V_{V(cap)}=V_{V(cap)}(\text{level 3})\times V_{V(tis)}(\text{level 2})\times V_{V(par)}(\text{level 1}) \quad (4)$$

Surface density $S_{V(par)}$ is calculated using the following equation:

$$S_{V(par)} = \frac{4}{l} \times \frac{\sum I}{\sum P} \quad (5)$$

where l is the length of the grid line, $\Sigma I$ is the number of intersects counted, and $\Sigma P$ is the number of line end points falling on parenchymal tissue. Since surface density is the surface area in a given volume, the surface area of the parenchyma is calculated by multiplying the surface density by the volume fraction of parenchymal tissue ($V_{V(tis)}$) and the total volume of the lung, which is calculated from the CT scan as described above. A surface area to volume ratio for each subject is then obtained by dividing the subject's surface area by the subject's lung volume.

In Step 8, the morphologically determined surface area to volume ratio derived from the resected lung specimens is plotted against the median volume-of-gas to weight-of-tissue ratio for each lung being analyzed. (See FIG. 4.) Thereafter, in Step 9, a best-fit exponential prediction equation (a solid line illustrated in FIG. 4) is determined. One example of the invention, described in detail below, produced the following prediction equation:

$$\text{Surface Area/Volume}(cm^2/ml)=e^{6.82-0.32\times ml\ gas/g\ tissue} \quad (6)$$

It should be understood that Equation 6 is provided as an example of a prediction equation obtained in accordance with the present invention, and other prediction equations may be readily derived using the present invention, depending on a specific application. In this regard, since the present method may be applied to any species with lungs, species-specific prediction equations can be developed using this invention.

According to the present invention, a prediction equation obtained in the manner described above can be used to predict the surface area to volume ratio and surface area of a new lung, using the x-ray attenuation data obtained from a CT scan of the new lung. The steps involved in this aspect of the invention are shown in FIG. 3. First, at least one CT image that includes an image of the new lung is obtained (block 10). As will be apparent to those skilled in the art, the more CT images that are obtained, the better will be the resulting lung analysis. In some circumstances, however, it may be preferable to obtain a smaller set of images that does not exhaustively sample the new lung for various reasons, for example, when it is desirable to limit the radiation dose for a particular patient. The CT image is displayed on a screen (block 12) and the lung image is extracted from the CT image (block 14), in the manner described above. Then the volume-of-gas to weight-of-tissue ratio for each pixel included in the lung image is calculated (block 16). The pixel ratio values are used to calculate the median volume-of-gas to weight-of-tissue ratio for all the pixels included in the new lung image (block 18), also as described above. Optionally, the volume of the lung may be calculated by summing up pixel dimensions of the lung image, using the Cavalieri principle as described above (block 20). The median volume-of-gas to weight-of-tissue ratio is then input into the best-fit prediction equation produced in the manner described above, to obtain the surface area to volume ratio of the lung (block 22). When the volume of the lung is determined in block 20, the surface area to volume ratio is multiplied by the volume to obtain the surface area of the lung (block 24).

Once the best-fit prediction equation that correlates the surface area to volume ratio and the volume-of-gas to weight-of-tissue ratio of a species lung is derived, the method illustrated in FIG. 3 and described above can be used to estimate the surface area to volume ratio and the surface area of a new lung. This method is readily implementable as computer program, as demonstrated in the Example described below.

It has been found that mild emphysema is associated with an increase in lung volume and a reduction in surface area to volume ratio with respect to normal tissue weight, whereas severe emphysema is associated with a reduction in lung tissue weight and a large reduction in lung surface area to volume ratio and surface area. With this knowledge, it will be appreciated that the present method of estimating the surface area to volume ratio and the surface area of the lung is highly useful in monitoring patients with pulmonary emphysema.

EXAMPLE

In this example, the CT scan and lung histology were used to assess the lungs of human patients undergoing either lobar resection for tumor or lung volume reduction surgery.

Patients were categorized into three groups: the control group; the mild-emphysema group; and the severe-emphysema group. The patients in the control and mild-emphysema groups required either a lobectomy or pneumonectomy for a non-obstructing, peripheral bronchogenic carcinoma, less than 3 cm in diameter, and were part of an ongoing study of lung structure and function at the University of British Columbia. The severe-emphysema group was selected for lung volume reduction surgery at the University of Pittsburgh, using the criteria set forth in "Improvement in pulmonary function and elastic recoil after lung-reduction surgery for diffuse emphysema," Sciurba et al., *The New England Journal of Medicine,* 334:1095–1099 (1996). The separation into three groups was based on the percent of the lung that was determined to be emphysematous using the "density mask" technique, as described in "Density mask. An objective method to quantitative emphysema using computed tomography," Muller et al., *Chest,* 94:782–787 (1988).

All subjects received a conventional, contrast CT scan (10 mm thick contiguous slices) on a GE 9800 Highlight Advantage CT scanner (General Electric Medical Systems, Milwaukee, Wis.) approximately one week prior to surgery. The scanners were calibrated regularly using standard water and air phantoms to allow for comparisons between individuals. These scans were performed with the subjects holding their breath while supine.

The lung parenchyma was segmented from the chest and the large central blood vessels using CT values (x-ray attenuation values) threshold of −1000 to −500 HU. After the lung is identified and segmented, the lung image was passed to computer programs written in the PV-Wave language (Visual Numerics, Boulder, Colo.) to conduct the CT scan analysis to evaluate the lung in terms of volume, density, volume-of-gas to weight-of-tissue ratio, and other information.

A CT estimation of tissue volume fraction was calculated according to the following equation:

$$V_{V(CT)} = \frac{\text{Specific Volume of Tissue}}{\text{Specific Volume of Total lung}_{(CT)}} \quad (7)$$

and used to correct the histologic estimates of the tissue and airspace to the level of inflation that the subject (patient) achieved during the CT scan.

The specimens were then resected and analyzed using quantitative histology. Thereafter, the morphologically determined surface area to volume ratio was compared to the median CT measurement of the volume-of-gas to weight-of-tissue ratio, and a prediction equation of best fit was determined. (FIG. 4.)

Figure 4:
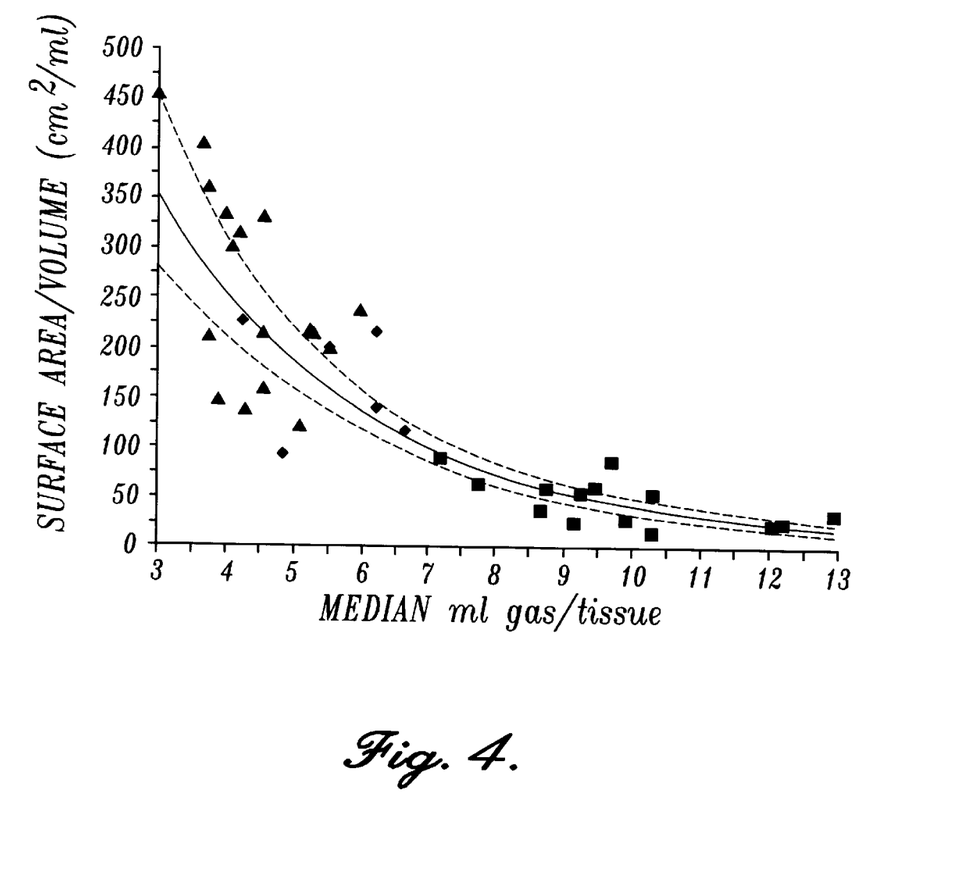
FIG. 4 shows a sample regression line (solid line) and the 95% confidence limits (dashed line) of a histology-measured surface area to volume ratio of patients' lungs versus median CT-measured volume-of-gas to weight-of-tissue ratio. The prediction equation for this line is Equation 6 described below. The individual data points for each patient are shown for reference as: control patient (▲), mild-emphysema patient (♦), and severe-emphysema patient (■).

FIG. 4 shows there is a good relationship between the median volume-of-gas to gram-of-tissue ratio obtained from the CT scan and the surface area to volume ratio obtained using histology in each case. This relationship is described by Equation 6, which shows an exponential decline in surface area as the volume/gram increases.

According to the present invention, emphysematous lung destruction can be quantified using the relatively noninvasive CT scan data, in conjunction with a prediction equation that relates CT measurements of lung inflation (volume-of-gas to weight-of-tissue ratio) and histological measurements of surface area to volume ratio. The algorithms that have been developed could make estimates of surface area to volume ratios and surface area available to clinicians to assess both the natural history of emphysema and the impact of surgical and medical interventions.

While the preferred embodiments of the invention have been illustrated and described, it will be appreciated that various changes can be made therein without departing from the spirit and scope of the invention. In particular, though the method was described as using images from a specific computed tomography scanner and evaluated using a commercial numerical analysis program on a specific computer platform, it should be understood that the method can be performed using other computed tomography images and computer-programming languages, and is independent of computer manufacturer or architecture. Therefore, the method is applicable to the analysis of any and all computed tomography images from patients with pulmonary emphysema. Further, the method may be equally applicable to any other species with lungs, for example, pigs and guinea pigs, by way of nonlimiting examples.

The embodiments of the invention in which an exclusive property or privilege is claimed are defined as follows:

1. A method of estimating a lung's surface area to volume ratio using x-ray attenuation data obtained from computed tomography (CT) scans, comprising:
   (a) obtaining a plurality of CT images that include the image of a lung from a plurality of subjects;
   (b) for each CT image:
      (I) displaying the CT image on a screen such that an x-ray attenuation value is associated with each pixel, and
      (ii) based on user input, extracting the lung image from the CT image;
   (c) calculating the volume of each lung based on the lung images extracted from the plurality of CT images, respectively;
   (d) calculating the volume-of-gas to weight-of-tissue ratio of each lung, by:
      (i) calculating the volume-of-gas to weight-of-tissue ratio for each pixel included in each of the images of the lung using the x-ray attenuation value associated with the pixel, and (ii) calculating the median volume-of-gas to weight-of-tissue ratio for all of the pixels included in all of the lung images;

(e) using quantitative histology, obtaining the surface area to volume ratio of each lung;

(f) plotting the surface area to volume ratio versus the median volume-of-gas to weight-of-tissue ratio for each lung; and (g) determining a best-fit prediction equation that correlates the surface area to volume ratio to the volume-of-gas to weight-of-tissue ratio.

2. The method of claim 1, wherein the extraction of the lung comprises:

a user identifying and marking the lung image in the CT image with a point; and in response to a user selecting a threshold x-ray attenuation value, extracting the lung image that contains the point therein from the CT image.

3. The method of claim 1, wherein the volume-of-gas to weight-of-tissue ratio for each pixel is calculated as:

volume-of-gas (ml)/weight-of-tissue (g)=1000/(x-ray attenuation value−24)−1/1.065.

4. The method of claim 1, wherein the calculation of the volume-of-gas to weight-of-tissue ratio for each pixel comprises:

determining the density of lung tissue;

determining the density of the lung including both tissue and gas at the location of the pixel using the x-ray attenuation data; and subtracting an inverse of the density of the lung tissue from an inverse of the density of the lung including both tissue and gas.

5. The method of claim 1, further comprising:

obtaining at least one CT image that contains a new lung image;

displaying the CT image that contains the new lung image such that an x-ray attenuation value is associated with each pixel;

based on user input, extracting the new lung image from the CT image;

calculating the volume-of-gas to weight-of-tissue ratio for each pixel included in the new lung image using the x-ray attenuation value associated with the pixel;

calculating the median volume-of-gas to weight-of-tissue ratio for all of the pixels included in the new lung image; and inputting the median volume-of-gas to weight-of-tissue ratio into the prediction equation to obtain the surface area to volume ratio of the new lung.

6. The method of claim 5, further comprising:

determining the volume of the new lung that created the new lung image; and multiplying the surface area to volume ratio by the volume to obtain the surface area of the lung that created the new lung image.

7. The method of claim 6, wherein the volume is calculated by:

(a) obtaining a plurality of CT images that include the image of the new lung;

(b) for each CT image:

(i) displaying the CT image such that an x-ray attenuation value is associated with each pixel, (ii) based on user input, extracting the new lung image from the CT image, and (iii) multiplying the area of a pixel by the number of pixels included in the new lung image and further by a CT image slice thickness, to obtain the lung volume of the CT image; and (c) summing up the lung volume of all of the CT images.

8. The method of claim 5, wherein the extraction of the new lung comprises:

a user identifying and marking the new lung image in the CT image with a point; and in response to a user selecting a threshold x-ray attenuation value, extracting the new lung image that contains the point therein from the CT image.

9. The method of claim 5, wherein the volume-of-gas to weight-of-tissue ratio for each pixel in the new lung is calculated as:

volume-of-gas (ml)/weight-of tissue (g)=1000/(x-ray attenuation value−24)−1/1.065.

10. The method of claim 5, wherein the calculation of the volume-of-gas to weight-of-tissue ratio for each pixel within the new lung comprises:

determining the density of lung tissue;

determining the density of the new lung including both tissue and gas at the location of the pixel using the x-ray attenuation data; and subtracting an inverse of the density of the lung tissue from an inverse of the density of the new lung including both tissue and gas.

11. A method of estimating the surface area to volume ratio of a lung using x-ray attenuation data obtained from a computed tomography (CT) scan of the lung, comprising:

obtaining at least one CT image that includes an image of the lung;

displaying the CT image such that an x-ray attenuation value is associated with each pixel of the image;

in response to user input extracting the lung image from the CT image;

calculating the volume-of-gas to weight-of-tissue ratio for each pixel included in the lung image using the x-ray attenuation value associated with the pixel;

calculating the median volume-of-gas to weight-of-tissue ratio for all of the pixels included in the lung image; and determining the surface area to volume ratio of the lung based on the median volume-of-gas to weight-of-tissue ratio.

12. The method of claim 11, wherein the surface area to volume ratio of the lung is obtained by inputting the median volume-of-gas to weight-of-tissue ratio into the following prediction equation:

$$\text{Surface Area/Volume}(cm^2/ml)=e^{6.82-0.32 \times ml\ gas/g\ tissue}$$

as the ml gas/g tissue value.

13. The method of claim 12, further comprising:

determining the volume of the lung that created the lung image; and multiplying the surface area to volume ratio by the volume to obtain the surface area of the lung that created the lung image.

14. The method of claim 13, wherein the volume is calculated by:

(a) obtaining a plurality of CT images that include the image of the lung;

(b) for each CT image:
  (i) displaying the CT image that contains the lung image such that an x-ray attenuation value is associated with each pixel,
  (ii) based on user input, extracting the new lung image from the CT image, and
  (iii) multiplying the area of a pixel by the number of pixels included in the lung image and further by a CT image slice thickness, to obtain the lung volume of the CT image; and
(c) summing up the lung volume of all of the CT images.

15. The method of claim 11, wherein the extraction of the lung comprises:
  a user identifying and marking the lung image in the CT image with a point; and
  in response to a user selecting a threshold x-ray attenuation value, extracting the lung image that contains the point therein from the CT image.

16. The method of claim 11, wherein the volume-of-gas to weight-of-tissue ratio for each pixel is calculated as:

volume-of-gas (ml)/weight-of-tissue (g)=1000/(x-ray attenuation value−24)−1/1.065.

17. The method of claim 11, wherein the calculation of the volume-of-gas to weight-of-tissue ratio for each pixel comprises:
  determining the density of lung tissue;
  determining the density of the lung including both tissue and gas at the location of the pixel using the x-ray attenuation data; and
  subtracting an inverse of the density of the lung tissue from an inverse of the density of the lung including both tissue and gas.

18. A computer-readable medium having computer-executable instructions for estimating a lung's surface area to volume ratio using x-ray attenuation data obtained from a computed tomography (CT) scan of the lung, the instructions when loaded into a computer causing the computer to execute the steps of:
  receiving at least one CT image that includes an image of the lung;
  displaying the CT image such that an x-ray attenuation value is associated with each pixel of the image;
  in response to user input extracting the lung image from the CT image;
  calculating the volume-of-gas to weight-of-tissue ratio for each pixel included in the lung image using the x-ray attenuation value associated with the pixel;
  calculating the median volume-of-gas to weight-of-tissue ratio for all of the pixels included in the lung image; and
  determining the surface area to volume ratio of the lung based on the median volume-of-gas to weight-of-tissue ratio.

19. The medium of claim 18, wherein the surface area to volume ratio of the lung is obtained by inputting the median volume-of-gas to weight-of-tissue ratio into the following prediction equation:

$$\text{Surface Area/Volume}(cm^2/ml) = e^{6.82 - 0.32 \times ml\ gas/g\ tissue}$$

as the ml gas/g tissue value.

20. The medium of claim 19, further causing the computer to execute the steps of:
  determining the volume of the lung that created the lung image; and
  multiplying the surface area to volume ratio by the volume to obtain the surface area of the lung.

21. The medium of claim 20, wherein the volume is calculated by:
  (a) receiving a plurality of CT images that include the image of the lung;
  (b) for each CT image:
    (i) displaying the CT image such that an x-ray attenuation value is associated with each pixel,
    (ii) based on user input, extracting the new lung image from the CT image, and
    (iii) multiplying the area of a pixel by the number of pixels included in the lung image and further by a CT image slice thickness to obtain the lung volume of the CT image; and
  (c) summing up the lung volume of all of the CT images.

22. The medium of claim 18, wherein the extraction of the lung comprises:
  a user identifying and marking the lung image in the CT image with a point; and
  in response to a user selecting a threshold x-ray attenuation value, extracting the lung image that contains the point therein from the CT image.

23. The medium of claim 18, wherein the volume-of-gas to weight-of-tissue ratio for each pixel is calculated as:

volume-of-gas (ml)/weight-of-tissue (g)=1000/(x-ray attenuation value−24)−1/1.065.

24. The medium of claim 18, wherein the calculation of the volume-of-gas to weight-of-tissue ratio for each pixel comprises:
  receiving the density of lung tissue;
  determining the density of the lung including both tissue and gas at the location of the pixel using said x-ray attenuation data; and
  subtracting an inverse of the density of the lung tissue from an inverse of the density of the lung including both tissue and gas.

* * * * *